(12) United States Patent
Delaporte

(10) Patent No.: US 7,437,921 B2
(45) Date of Patent: Oct. 21, 2008

(54) ASSEMBLY INCLUDING A PRESSURE SENSOR, WITH AN ACTIVATION MODULE, AND A MICROPROCESSOR FOR MEASUREMENT AND CONTROL PURPOSES

(75) Inventor: Francis Delaporte, Osny (FR)

(73) Assignee: Johnson Controls Automotive Electronics, Cergy Pontoise (FR)

(*) Notice: Subject to any disclaimer, the term of this patent is extended or adjusted under 35 U.S.C. 154(b) by 13 days.

(21) Appl. No.: 10/505,340

(22) PCT Filed: Feb. 20, 2003

(86) PCT No.: PCT/FR03/00571
§ 371 (c)(1),
(2), (4) Date: May 10, 2005

(87) PCT Pub. No.: WO03/070495
PCT Pub. Date: Aug. 28, 2003

(65) Prior Publication Data
US 2005/0206512 A1 Sep. 22, 2005

(30) Foreign Application Priority Data
Feb. 21, 2002 (FR) ................. 02 02201

(51) Int. Cl.
B60C 23/02 (2006.01)

(52) U.S. Cl. .................. 73/146.5; 340/442
(58) Field of Classification Search ......... 73/146.2, 73/146, 146.5; 340/442, 445, 44
See application file for complete search history.

(56) References Cited

U.S. PATENT DOCUMENTS

| 5,656,993 | A | 8/1997 | Coulthard |
| 5,783,992 | A | 7/1998 | Eberwine et al. |
| 6,271,748 | B1* | 8/2001 | Derbyshire et al. ......... 340/442 |
| 6,545,599 | B2* | 4/2003 | Derbyshire et al. ......... 340/442 |
| 6,619,110 | B1* | 9/2003 | Delaporte ................. 73/146.2 |
| 6,684,691 | B1* | 2/2004 | Rosseau ...................... 73/146 |
| 7,076,999 | B1* | 7/2006 | Knox ......................... 73/146.3 |
| 2002/0044050 | A1* | 4/2002 | Derbyshire et al. ......... 340/442 |
| 2003/0102966 | A1* | 6/2003 | Konchin et al. ............ 340/445 |
| 2006/0180647 | A1* | 8/2006 | Hansen ....................... 235/375 |

* cited by examiner

Primary Examiner—Andre J Allen
(74) Attorney, Agent, or Firm—Foley & Lardner LLP

(57) ABSTRACT

A tire pressure assembly includes a tire pressure sensor for automobile vehicle wheels and a microprocessor for pressure measurement and for control of a radio transmission circuit. The sensor has a module for activating the microprocessor associated with an activation control timer. The timer is programmable and the assembly includes means for programming the timer.

17 Claims, 3 Drawing Sheets

ASSEMBLY INCLUDING A PRESSURE SENSOR, WITH AN ACTIVATION MODULE, AND A MICROPROCESSOR FOR MEASUREMENT AND CONTROL PURPOSES

BACKGROUND

The present application relates to pressure sensors for the tires of automobile vehicles.

In order to ensure the safety of automobile vehicles, their tires are fitted with pressure sensors connected by radio to the on-board computer in order to signal any fault. The sensor housed inside the tire is powered by a battery. In order to retain the autonomy of the battery of the sensor, which is inaccessible, this sensor operates only in a cyclical manner, i.e. it has a timing circuit, for activation purposes, which has a very low power consumption and which cyclically activates a microprocessor for a short period, this microprocessor measuring the pressure and temperature and transmitting these measurements by radio.

A wheel rim carrying the sensor can reach high temperatures in the case of repeated intense braking and the microprocessor of the sensor is thus heated to a temperature of about one hundred degrees Celsius.

This temperature exceeds the limit at which industrial standard integrated circuits can be guaranteed to operate properly. There are military standard integrated circuits with a wider operating temperature range but they are naturally more expensive.

A solution has therefore been required to avoid the risk of the thermal destruction of the circuits by operation outside their thermal range.

An earlier solution presented in the application FR 00 12 657 proposes a tire pressure sensor for an automobile vehicle having a module for activating a microprocessor for measuring and controlling radio transmission circuits and temperature-sensitive inhibiting means to inhibit the activation module. This solution consists of using the activation module as a switch for the operation of the microprocessor so that cyclical operation takes place only if the temperature does not exceed a specific threshold.

The major disadvantage of this system is derived from the difficulty in regulating the threshold and the period of the cycle in dependence, principally, upon the integrated circuits used, the specifications of the manufacturers and assembly and/or usage adjustments.

Furthermore, automobile vehicles are assembled on automatic vehicle assembly lines which include a manual step of teaching the vehicle's on-board computer the identification numbers of the wheels and their corresponding location on the vehicle. This manual operation is normally carried out at a diagnostic station integrated into the vehicle assembly line and wheel assembly line for these vehicles, taking into account the fact that a precise location of the wheel on the vehicle corresponds to the position of a wheel in the wheel assembly line.

SUMMARY

The applicant has also sought to cause the pressure sensors to permit automation of this step of teaching the identification of the sensors and location of the corresponding wheels in the on-board computer of the corresponding vehicle.

The applicant has in the first place sought to overcome the difficulty in control while improving the operation of the sensor without increasing the cost thereof.

More precisely, the applicant has sought to propose a pressure sensor which is adjustable and compatible with the high rate of wheel and vehicle assembly on their respective assembly lines.

To this end one embodiment relates to an assembly including a tire pressure sensor for automobile vehicle wheels and a microprocessor for pressure measurement and for control of a radio transmission circuit, the sensor having a module for activating the microprocessor associated with an activation control timer, characterized in that the timer is programmable and means are provided for programming it.

In some embodiments it is possible to dispense with the use of a threshold to control the operation of the activation module by directly modulating the rate of activation of the microprocessor by a program.

The microprocessor is preferably arranged to program the timer.

In some embodiments, the means necessary for activation of the microprocessor are located in the microprocessor itself.

In a first embodiment the timer is mounted in the pressure sensor and is arranged to control the variable-period activation module.

In a second embodiment the timer is mounted in the microprocessor (4) and is arranged to be controlled by the fixed-period activation module.

Other features and advantages will become clearer in the detailed description herein under of two embodiments of the invention, made with reference to the attached drawing in which:

DESCRIPTION OF EXEMPLARY EMBODIMENTS

Figure 1:
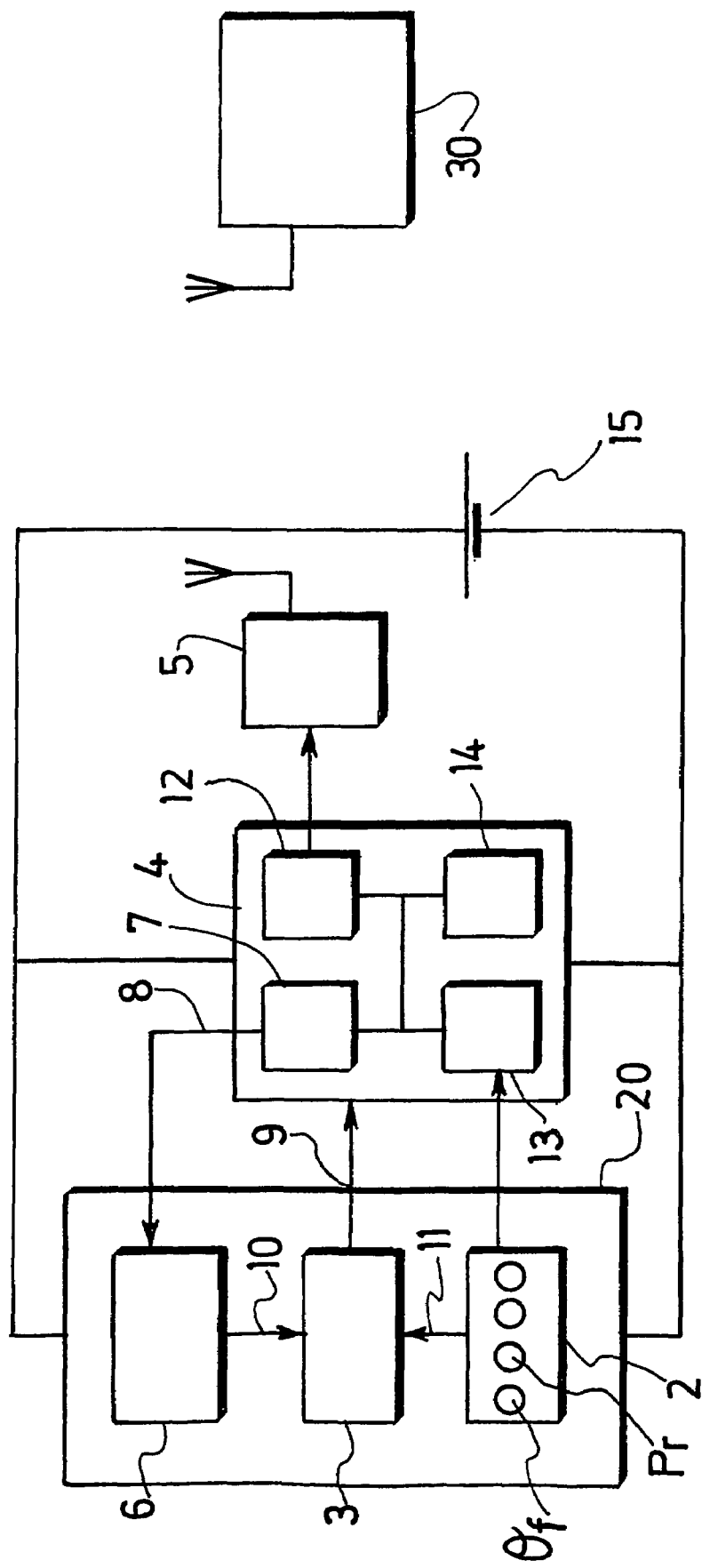
FIG. 1 illustrates a functional block diagram of the first embodiment of the pressure sensor and of the microprocessor of the invention.

In the first embodiment of FIG. 1 the tire pressure sensor 20 is associated with a power-supply battery 15, a measuring microprocessor 4, also powered by the battery 15 and able to take, by means of a polling function 13, and to process, by means of a monitor 12, measurements of physical variables including the pressure of the tire Pr, the operating temperature $\theta_f$ and other indicative parameters relating to the rotation of the wheel, for example the speed of rotation $V_r$ or the centrifugal force $F_r$. These physical variables are sensed by an assembly 2 of microsensors, respectively manometric membrane, thermistor, microgyroscope or microaccelerometer or rolling switch. The monitor 12 of the microprocessor 4 controls a radio transmission circuit 5 to communicate, to the vehicle's on-board computer 30, in operating time, the identification ID of the sensor, the measurements collected and possibly certain results of the processing carried out, these data being organized in a predetermined frame in order to be transmitted.

An activation module 3 in the pressure sensor 20 connected to the microprocessor 4 by a connection 9 initiates operation of this microprocessor in a cyclical manner with a period T imposed by an activation control timer 6 mounted in the sensor 20 connected to the activation module 3 by a connection 10. The period T is calculated by a timing function 7 of the microprocessor 4 in order to program the timer 6 via a connection 8. In the proposed exemplified embodiment the function 7 forms part of the microprocessor 4. The activation module 3 also receives information on the pressure and/or rotation of the wheel from the microsensor assembly 2.

From the polling function 13 and by means of the monitor 12 the timing function 7 receives the values of the physical variables it requires to calculate the period T to be imposed on the activation module.

The organization of the wheel and vehicle assembly lines should now be discussed.

Figure 2:
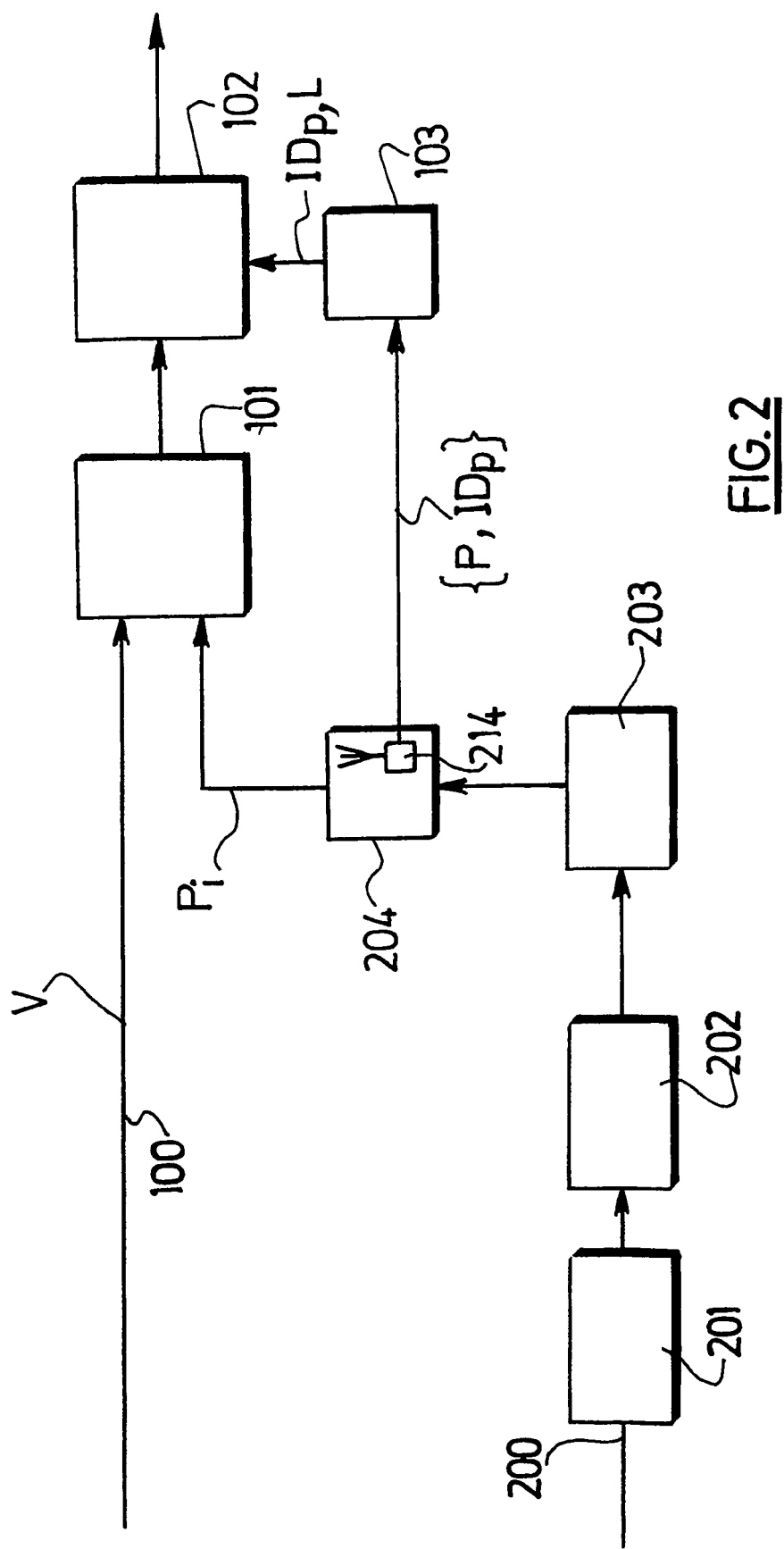
FIG. 2 illustrates a simplified block diagram of vehicle and wheel assembly lines on which sensors such as that of FIG. 1 are assembled and FIG. 3 illustrates a diagram of a part of the functional blocks of the second embodiment of the pressure sensor and of the microprocessor of the invention.

With reference to FIG. 2 the vehicle assembly line 100 includes the vehicle of the number or row V of the line. In a parallel manner on the wheel assembly line 200 the wheels of the vehicle V are assembled, the successive numbers or rows Pi=Po+i of which (i being an integer from 0 to 4) in the line are in a biunique relationship with the number V of the vehicle on which they will be assembled at the station 101. For example the first wheel assembled on the vehicle V is such that:

$$Po = 5 \times V - 4$$

the integer i being an indicator of the location L of the wheel Po+i on the vehicle V.

For example it is possible to consider that i=1 if the wheel is located at the front left of the vehicle, that i=0 if it is the spare wheel, etc. . . .

In other words in this example it is possible to deduce from the position Pi of the wheel on the wheel assembly line its allocation to the vehicle V, its location L on the vehicle V of the vehicle assembly line by calculating the integer i as follows:

$$\left. \begin{array}{c} i = Pi - 5 \times V + 4 \\ \text{with } 0 \leq i \leq 4 \end{array} \right\} \quad (1)$$

Thus on the wheel assembly line, after a step 201 of mounting the pressure sensors and a step 202 of mounting the tires on the wheel rims, the process passes to an inflation step 203 and a wheel-balancing step 204. These operations are very quick. Thus the balancing only takes a few seconds. During this latter wheel-balancing step, the number Pi of the wheel and the identification number IDp of the wheel pressure sensor are sensed, this latter being sensed by a receiver 214 in the manner explained below. These two parameters are transmitted to a diagnostic station 103 which registers that the wheel Pi is fitted with a pressure sensor with the identification IDp. When the vehicle no. V, at a step 102, arrives at the diagnostic station 103 for teaching of its on-board computer, the station 103 deduces that the vehicle V is fitted with wheels Pi=5 V−4+i with 0≦i≦4 (2) of identification IDp and location L corresponding to the integer i.

The operation of the pressure sensor 20, from the time of its installation on the wheel assembly line until its current usage, will now be described.

At the start of the wheel assembly line the battery 15 powers the electronic elements but they are in a so-called storage mode and the current consumed is very low (less than 100 nA). In the storage mode the sensor activates the microprocessor after a specific period in order for it to read the pressure value, validate the mode and return to the dormant mode. In this mode the transmission circuit is always in dormant mode.

Storage mode is maintained as long as the microprocessor 4 does not detect a pressure difference. Under the action of a pressure microsensor, typically a manometric membrane of the assembly 2, if the pressure exceeds a certain threshold (in this case 0.7 bar) there is a transition from the storage mode to the parking mode and the system becomes active. In parking mode the activation period can be, for example, one hour. Incidentally, it will be noted that in driving mode (road) the period can be one minute.

In a predetermined step of the wheel assembly line it is possible automatically to transmit to the vehicle assembly line 100 the position Pi of the wheel on which the pressure sensor is mounted.

The predetermined step of the wheel assembly line which is of relevance in this case can be the step 203 for pressurizing the tire (inflation) or preferably the wheel-balancing step 204. In this step the activation period can be very short (for example 1 s). Depending on the case the information from the pressure microsensor Pr (manometric membrane) or rotation microsensor (microgryo) Vr or even the centrifugal force sensor Fr (rolling switch, microaccelerometer) is transmitted to the activation module 3 by the connection 11 from the microsensor assembly 2, which causes the microprocessor 4 to be activated via the connection 9. The connections 8, 9, 10 may conform to the protocol SPI (Synchronous Protocol Interface). The monitor 12 of the microprocessor initiates the polling function 13 and receives the measurements P.sub.r, .theta..sub.f, V.sub.r therefrom which it transmits to the timing function 7 in order to program the timer 6.

The timing function 7 checks the content of the memory 14. If this content corresponds to its storage mode then assembly is taking place and the timing function 7 communicates to the timer 6 a period $T_1$ of transmission of the predetermined frame containing, in particular, the identification number ID of the sensor compatible with the assembly rate of the assembly lines, stores in memory 14 the new state of operation of the sensor corresponding to the assembly phase, then returns the microprocessor 4 to its dormant state.

The timer 6 subsequently activates the activation module 3 in the period $T_1$ in order to activate the microprocessor 4 which, taking account of the state of the memory 14 and by means of the monitor 12, controls the transmission circuit 5 to transmit the predetermined frame, then returns to its dormant state.

The period T.sub.1 is very short, of the order of a few tens of seconds, and the corresponding frames 204 are, for example, transmitted during the period covering the time in which the wheel balancing step is carried out on the wheel assembly line, so as to avoid any ambiguity with the wheels which precede or follow in the assembly line. At the wheel-balancing station 204 processing the wheel at position P in the wheel assembly line 200 a radio receiver 214 is provided receiving the predetermined frame transmitted by the pressure sensor of the wheel P and containing, in particular, the identification IDp of the said sensor. The radio receiver 214 produces a message containing the data P and IDp which it communicates to the diagnostic station 103 responsible for teaching the on-board computer of the vehicles of row V on the vehicle assembly line 100. For each vehicle V the diagnostic station 103 deduces which wheels P are to be fitted to it, for example, by the formulae (2) and to which location L these wheels P of sensor IDp are allocated, for example, by the formulae (1). The radio receiver 214 initializes the diagnostic station 103 which will program the on-board computer of the vehicle V when this vehicle is at the teaching station 102.

The interval from the time of transmission of the frame to the period $T_1$ can be determined by detecting the rotation of the wheel by the assembly 2. The pressure sensor is then placed in its parking mode by the microprocessor 4, the timer being adjusted to a period $T_2$ of about one hour.

When the vehicle is in current use, this parking mode is interrupted when the wheel is caused to rotate again, the process remains the same but the state of the memory 14 shows that assembly is no longer taking place and the timing function 7 calculates a period $T_2$ which this time is not a predetermined period but which depends on measurements collected by the polling function 13, principally the temperature $\theta_f$ of the tire.

For a normal temperature $\theta_f$ the period $T_2$ is fixed at a few seconds.

If the temperature $\theta_f$ becomes excessive, for example, because of heating of the tires as a result of repeated braking, the period $T_2$ can be changed to close to 2000 seconds. It will be clear that the temperature may fall again during this time. For this reason it may be advantageous to activate the microprocessor prematurely and to activate the timing function 7 in order to modify the activation period. To this end the activation module 3 is sensitive to a gradient in the temperature $\theta_f$ by the connection 11 and activates the microprocessor 4 if the temperature $\theta_f$ varies by a certain percentage in the duration of a period $T_2$.

An embodiment is described above in which the activation control timer 6 was located in the pressure sensor, outside the microprocessor 4, and could be programmed by the microprocessor 4, the activation module 3 being controlled by the programmable timer 6 to periodically activate the microprocessor following a variable period.

Figure 3:
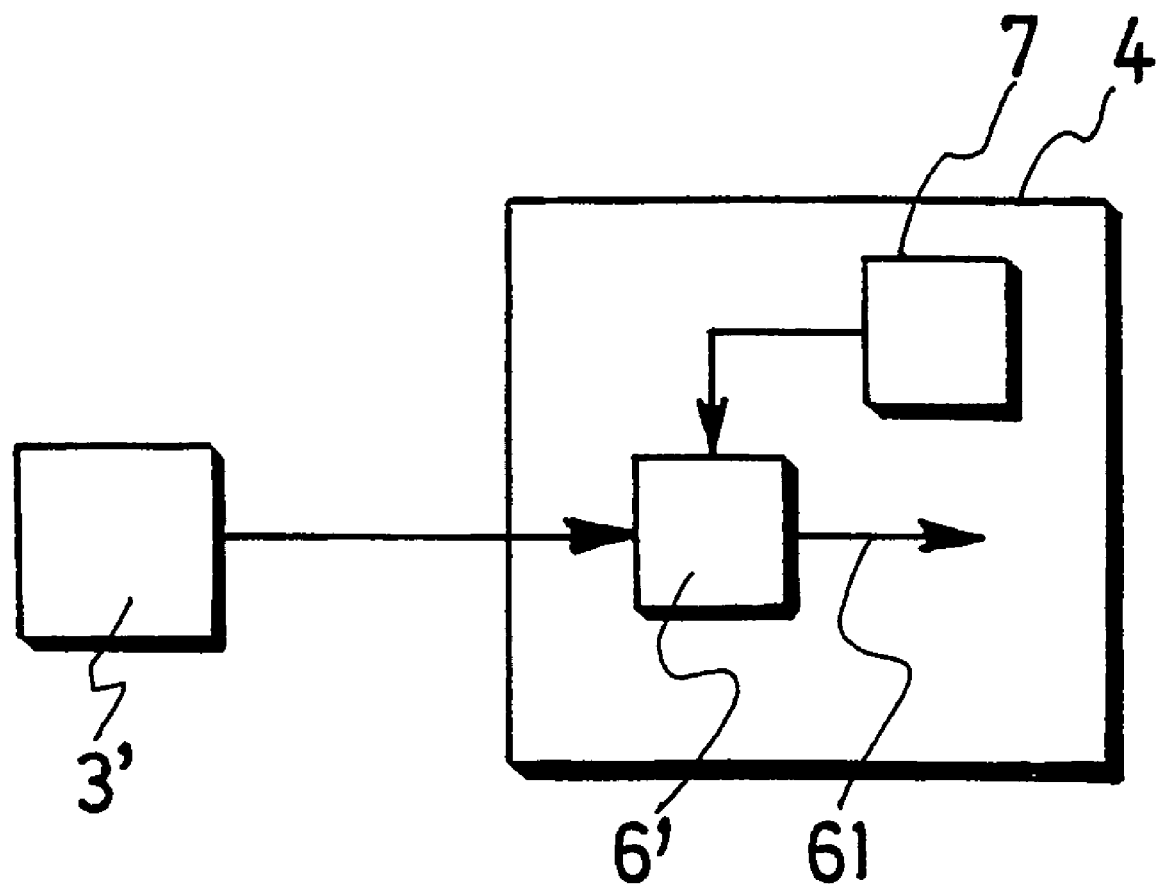

In another embodiment, of which only the elements which distinguish it from the first will be described with reference to FIG. 3, the activation module 3' in this case has a fixed period T (for example, one second). The activation control timer 6' is located inside the microprocessor 4. It is still a timer which can be programmed by the timing function 7 of the microprocessor but it is the activation module 3' which controls it in order that, via its output 61, it periodically activates the microprocessor 4 following a variable period P, being variable, for example, from 1 second to 2000 seconds, or 65536 seconds, if it is a $2^{16}$ bit timer. Thus if the period of the activation module 3' is 1 s, the pressure sensor will increment the timer 6' by one unit for each second and, if the timing function 7 has been "programmed to 8" for example, the activation of the microprocessor will take place every eight seconds, i.e. every eight pulses of the activation module. The timer 6' in this case acts as a frequency divider (period multiplier).

It will be noted that in the case of this second embodiment the microsensors 2 are not connected to the activation module 3'.

The invention claimed is:

1. An assembly, comprising:
a tire pressure sensor for automobile vehicle wheels; and
a microprocessor for pressure measurement and for control of a radio transmission circuit,
wherein the tire pressure sensor has an activation control timer and a module for activating the microprocessor that is associated with the activation control timer, wherein the activation control timer is programmable, and
wherein the microprocessor is arranged to program the activation control timer.

2. The assembly of claim 1, wherein the microprocessor for programming the activation control timer is sensitive to a temperature of a tire.

3. The assembly of claim 1, wherein the microprocessor for programming the activation control timer is sensitive to a pressure of a tire.

4. The assembly of claim 1, wherein the microprocessor for programming the activation control timer is sensitive to at least one of a speed of rotation and to a centrifugal force caused by rotation of a corresponding wheel.

5. The assembly of claim 4, further comprising a radio transmission circuit controlled by the microprocessor, wherein the radio transmission circuit is arranged to transmit information containing at least an identification of the sensor at an accelerated rate during balancing of the corresponding wheel being assembled and at a slowed rate when a temperature of the corresponding wheel increases.

6. The assembly of claim 1, wherein the activation control timer is mounted in the pressure sensor and is arranged to control a variable-period activation module.

7. The assembly of claim 1, wherein the activation control timer is mounted in the microprocessor and is arranged to be controlled by a fixed-period activation module.

8. A pressure assembly for use with a wheel of a motor vehicle, the assembly comprising:
a tire pressure sensor; and
a processing circuit configured to receive signals from the tire pressure sensor and output data based on the tire pressure, the processing circuit having a periodic operation;
wherein a period of the periodic operation of the processing circuit is variable and comprises a predetermined finite period of time which can be interrupted by occurrence of a predetermined event causing the processing circuit to operate.

9. The assembly of claim 8, wherein the predetermined event is determined based on a gradient in temperature.

10. The assembly of claim 8, wherein the processing circuit is configured to be controlled to operate at a first rate when a temperature is at a first value and is configured to be controlled to operate at second rate slower than the first rate when the temperature is at a second value higher than the first value.

11. The assembly of claim 10, wherein the processing circuit is configured to be controlled such that when operating at the second rate, the processing circuit is interrupted and will activate upon the occurrence of the predetermined event.

12. A method for operating a tire pressure sensor assembly of a motor vehicle configured to monitor pressure of a tire of the vehicle, comprising:
operating a microprocessor of the tire pressure sensor at a first rate greater than zero; and
operating the microprocessor at a second rate greater than zero in response to a signal received from a sensor that is configured to monitor a parameter of an environment of the tire, the second rate being different than the first rate.

13. The method of claim 12, wherein the second rate is slower than the first rate.

14. The method of claim 12, wherein the parameter of the tire is a temperature of the tire.

15. The method of claim 12, wherein operating the microprocessor comprises controlling the microprocessor with a timer.

16. The method of claim 15, wherein the timer is programmable based on data received from the sensor.

17. The method of claim 12, further comprising operating the microprocessor at a third rate greater than zero in response to a signal received from a second sensor that is configured to monitor a parameter related to the tire, the third rate being different than the first rate and the second rate.

* * * * *